United States Patent
Komatsubara et al.

(10) Patent No.: US 9,989,091 B2
(45) Date of Patent: Jun. 5, 2018

(54) FLUID DYNAMIC BEARING DEVICE AND MOTOR PROVIDED WITH SAME

(71) Applicants: Shinji Komatsubara, Mie (JP); Tetsuya Kurimura, Mie (JP); Yasuhiro Yamamoto, Mie (JP)

(72) Inventors: Shinji Komatsubara, Mie (JP); Tetsuya Kurimura, Mie (JP); Yasuhiro Yamamoto, Mie (JP)

(73) Assignee: NTN CORPORATION, Osaka (JP)

( * ) Notice: Subject to any disclaimer, the term of this patent is extended or adjusted under 35 U.S.C. 154(b) by 342 days.

(21) Appl. No.: 14/776,992

(22) PCT Filed: Feb. 19, 2014

(86) PCT No.: PCT/JP2014/053855
§ 371 (c)(1),
(2) Date: Sep. 15, 2015

(87) PCT Pub. No.: WO2014/148179
PCT Pub. Date: Sep. 25, 2014

(65) Prior Publication Data
US 2016/0040712 A1 Feb. 11, 2016

(30) Foreign Application Priority Data
Mar. 19, 2013 (JP) .................. 2013-056605

(51) Int. Cl.
*H02K 5/16* (2006.01)
*F16C 33/14* (2006.01)
(Continued)

(52) U.S. Cl.
CPC .......... *F16C 33/145* (2013.01); *F16C 17/107* (2013.01); *F16C 33/104* (2013.01);
(Continued)

(58) Field of Classification Search
CPC ...... H02K 7/08; H02K 5/1672; H02K 5/1675; F16C 33/145; F16C 33/107; F16C 17/107
(Continued)

(56) References Cited

U.S. PATENT DOCUMENTS 6,247,848 B1 6/2001 Iwaki et al.
2002/0051588 A1 5/2002 Koseki et al.
(Continued)

FOREIGN PATENT DOCUMENTS

JP 2000-283156 10/2000
JP 2001-140864 5/2001
(Continued)

OTHER PUBLICATIONS

International Preliminary Report on Patentability dated Sep. 22, 2015 in corresponding International Application No. PCT/JP2014/053855.
(Continued)

*Primary Examiner* — Hanh Nguyen
(74) *Attorney, Agent, or Firm* — Wenderoth, Lind & Ponack, L.L.P.

(57) ABSTRACT

Provided is a fluid dynamic bearing device (1) including a rotary body (2A), a bearing member (22) (sleeve portion) made of a sintered metal arranged on the rotary body (2A), having end surfaces (22b, 22c), a thrust bearing gap formed by a lower end surface (22c) of the bearing member (22), filled with lubricating oil (11), and a thrust dynamic pressure generating portion (B). A dynamic pressure generating action is caused in the lubricating oil in the thrust bearing gap along with rotation of the rotary body (2A) to support the rotary body (2A) in one thrust direction in a non-contact manner. The bearing member (22) has an oil permeability of 4% or more with respect to a mass flow rate of the lubricating oil (11) flowing along the thrust dynamic pressure
(Continued)

generating portion (B) during the rotation of the rotary body (2A).

10 Claims, 5 Drawing Sheets (51) Int. Cl.
  *H02K 5/167*  (2006.01)
  *F16C 17/10*  (2006.01)
  *F16C 33/10*  (2006.01)
  *H02K 7/08*  (2006.01)
  *F16C 33/74*  (2006.01)

(52) U.S. Cl.
  CPC ......... *F16C 33/106* (2013.01); *H02K 5/1675* (2013.01); *H02K 7/08* (2013.01); *F16C 33/74* (2013.01); *F16C 2360/46* (2013.01); *F16C 2380/26* (2013.01)

(58) Field of Classification Search
  USPC ............................................ 310/90; 384/100
  See application file for complete search history.

(56) References Cited

U.S. PATENT DOCUMENTS

| | | |
|---|---|---|
| 2006/0088234 A1 | 4/2006 | Nii et al. |
| 2007/0144833 A1 | 6/2007 | Nii et al. |
| 2009/0297077 A1 | 12/2009 | Nii et al. |
| 2010/0002966 A1* | 1/2010 | Hori ...................... F16C 17/107 384/100 |
| 2011/0317949 A1 | 12/2011 | Ito et al. |
| 2012/0315169 A1 | 12/2012 | Hori et al. |
| 2013/0101244 A1* | 4/2013 | Nishizawa ................ C22C 9/00 384/279 |
| 2013/0182979 A1 | 7/2013 | Ito et al. |
| 2014/0314354 A1* | 10/2014 | Nishizawa ............ F16C 33/104 384/279 |

FOREIGN PATENT DOCUMENTS

| | | |
|---|---|---|
| JP | 2005-232470 | 9/2005 |
| JP | 2007-100950 | 4/2007 |
| JP | 2010-65142 | 3/2010 |
| JP | 2011-7336 | 1/2011 |
| JP | 2012-67893 | 4/2012 |
| JP | 2013-2524 | 1/2013 |
| JP | 2013-204072 | 10/2013 |
| JP | 2014-1781 | 1/2014 |
| JP | 2004-308921 | 11/2014 |

OTHER PUBLICATIONS

Extended European Search Report dated Jul. 5, 2016 in corresponding European Application No. 14769442.6.
International Search Report dated Apr. 1, 2014 in International (PCT) Application No. PCT/JP2014/053855.
Chinese Search Report with the Chinese Office Action dated Jan. 24, 2017 in corresponding Chinese Application No. 201480016519.7 (with partial English translation).

* cited by examiner

| | COMPOSITION (IRON:COPPER) | OIL PERMEABILITY | RATE OF OIL PERMEABILITY TO MASS FLOW RATE[%] | DETERMINATION OF ACCEPTANCE |
|---|---|---|---|---|
| RELATED-ART EXAMPLE | 4:6 | 1 | 0.1 | × |
| EXAMPLE 1 | 7:3 | 46 | 4.52 | ○ |
| EXAMPLE 2 | 7:3 | 102 | 10.14 | ○ |

Fig. 9

FLUID DYNAMIC BEARING DEVICE AND MOTOR PROVIDED WITH SAME

TECHNICAL FIELD

The present invention relates to a fluid dynamic bearing device and a motor including the fluid dynamic bearing device.

BACKGROUND ART

As is well known, fluid dynamic bearing devices have features in their high speed rotation, high rotational accuracy, quietness, and the like. Through a good use of such features, the fluid dynamic bearing devices are suitably used as bearing devices for motors to be mounted to various electrical apparatus such as information apparatus, and more specifically, as bearing devices for spindle motors to be built in disk drives of HDDs and the like, or bearing devices for fan motors to be built in PCs and the like.

The fluid dynamic bearing device includes a radial bearing portion for supporting a rotary body with respect to a stationary body in a radial direction and a thrust bearing portion for supporting the rotary body with respect to the stationary body in thrust directions. In recent years, each of both the radial bearing portion and the thrust bearing portion has been formed of a fluid dynamic bearing that supports the rotary body in a non-contact manner in many cases.

There have been proposed various fluid dynamic bearing devices including the radial bearing portion and the thrust bearing portion, each being formed of the fluid dynamic bearing. For example, in FIG. 1 and FIG. 6 of Patent Literature 1, there is illustrated a fluid dynamic bearing device including a radial bearing gap in the radial bearing portion, which is formed by an inner peripheral surface of a sleeve portion (referred to as "fluid dynamic bearing" in Patent Literature 1) made of a sintered metal arranged on the stationary body, and a thrust bearing gap in the thrust bearing portion formed by an end surface of the sleeve portion on one side in an axial direction. When the thrust bearing portion is formed of the fluid dynamic bearing, a thrust dynamic pressure generating portion is formed on any one of two opposed surfaces that form the thrust bearing gap. The thrust dynamic pressure generating portion generally includes a plurality of dynamic pressure generating grooves arranged in a herringbone pattern or a spiral pattern and convex hill portions that define and form the dynamic pressure generating grooves. In this case, along with rotation of the rotary body, lubricating oil in the thrust bearing gap flows along the thrust dynamic pressure generating portion. The lubricating oil is pumped into a narrow-width portion of the thrust bearing gap, which has a smaller gap width, to increase a pressure of the lubricating oil in the thrust bearing gap (a dynamic pressure generating action is caused in the lubricating oil present in the thrust bearing gap). As a result, the thrust bearing portion formed of the fluid dynamic bearing is formed.

Incidentally, when spaces are formed on both sides of the sleeve portion in the axial direction as in the case of the fluid dynamic bearing device disclosed in Patent Literature 1, pressure balance of the lubricating oil filling the two spaces is lost along with an operation of the bearing device in some cases. If the thus lost pressure balance is left, support accuracy for the rotary body (bearing performance) in the thrust directions is disturbed.

In order to prevent the occurrence of the problem described above as much as possible, also as described in Patent Literature 1, it is effective to form a communication path for bringing both end surfaces of the sleeve portion (the space formed by one end surface of the sleeve portion and the space formed by another end surface of the sleeve portion) into communication with each other. Specifically, if the communication path as described above is formed, even when the pressure balance of the lubricating oil between the above-mentioned two spaces is lost, the lubricating oil flows from a higher pressure side to a lower pressure side through the communication path to restore the lost pressure balance at an early time. Therefore, desired bearing performance (bearing performance in the thrust directions, in particular) can be stably maintained. In the configuration of Patent Literature 1, the communication path can be formed by forming axial grooves on an outer peripheral surface of the sleeve portion or an inner peripheral surface of a housing opposed thereto.

CITATION LIST

Patent Literature 1: JP 2004-308921 A

SUMMARY OF INVENTION

Technical Problem

As described above, the communication path is advantageous in enabling the bearing performance of the fluid dynamic bearing device to be stably maintained to improve reliability of the fluid dynamic bearing device. In view of the need of additionally providing the axial grooves on at least one of the outer peripheral surface of the sleeve portion or the inner peripheral surface opposed thereto to form the communication path, however, manufacturing costs increase at least by some degree. In recent years, price reduction is rapidly accelerated for a motor in which the fluid dynamic bearing device is built and also for various information apparatus in which the motor is mounted. Therefore, further reduction in costs of the fluid dynamic bearing devices is requested.

Therefore, the present invention has an object to provide a fluid dynamic bearing device with high reliability, which is capable of demonstrating and maintaining desired bearing performance while costs can be further reduced by omitting a communication path.

Solution to Problem

As a result of numerous keen examinations, the inventors of the present invention have found that, even if the above-mentioned pressure balance is lost when a communication path is omitted, the lost pressure balance can be restored at an early time, specifically, a porous texture (continuous pores, that is, continuous innumerable internal pores) of the sleeve portion can be utilized as a substitute for the communication path as long as the porous texture that may enable a predetermined or larger amount of the lubricating oil to flow through the sleeve portion made of a sintered metal is provided. Further, the inventors of the present invention have found that, when the rate of an oil permeability of the sleeve portion to a mass flow rate of the lubricating oil flowing along a thrust dynamic pressure generating portion [=(oil permeability/mass flow rate)×100] during rotation of a rotary body is equal to or larger than a given value (specifically, 4% or larger), the porous texture of the sleeve portion can be used as a substitute for the communication path, resulting in arriving at the present invention.

When a thrust dynamic pressure generating portion includes, for example, a plurality of dynamic pressure generating grooves and convex hill portions that define and form the dynamic pressure generating grooves, the above-mentioned "mass flow rate" can be calculated based on a groove depth, a groove width, the number of the dynamic pressure generating grooves, and the like, and is expressed in the unit [g/10 min]. The above-mentioned "oil permeability" is a parameter for quantitatively indicating the amount of lubricating oil that is allowed to flow through the porous texture of the sleeve portion made of the sintered metal. The oil permeability is obtained by measuring a total weight of the lubricating oil exuded from a surface opening that is formed on an outer diameter surface of the sleeve portion when the lubricating oil applied with a predetermined pressure is caused to flow through a shaft hole of the sleeve portion (through hole in the axial direction) for ten minutes, and is expressed in the unit [g/10 min] similarly to the mass flow rate described above. The details of a method of measuring the oil permeability are described in the latter part.

Based on the above-mentioned findings, according to one embodiment of the present invention, there is provided a fluid dynamic bearing device, comprising: a stationary body; a rotary body configured to rotate relative to the stationary body; a sleeve portion made of a sintered metal provided to the stationary body or the rotary body, the sleeve portion having end surfaces on both sides in an axial direction of the sleeve portion; a radial bearing gap formed by an outer peripheral surface of the sleeve portion; a thrust bearing gap formed by the end surface of the sleeve portion on one side in the axial direction of the sleeve portion; lubricating oil for filling internal pores of the sleeve portion, the radial bearing gap, and the thrust bearing gap; and a thrust dynamic pressure generating portion, wherein: the lubricating oil present in the thrust bearing gap is caused to flow along the thrust dynamic pressure generating portion along with a rotation of the rotary body, to thereby cause a dynamic pressure generating action in the lubricating oil present in the thrust bearing gap, resulting in supporting the rotary body in a non-contact manner in one thrust direction; and the sleeve portion has an oil permeability of 4% or larger with respect to a mass flow rate of the lubricating oil flowing along the thrust dynamic pressure generating portion during the rotation of the rotary body.

As described above, with the sleeve portion made of the sintered metal having the oil permeability of 4% or larger with respect to the mass flow rate of the lubricating oil flowing along the thrust dynamic pressure generating portion during the rotation of the rotary body, even if the pressure of the lubricating oil is increased in a space formed by one end surface of the sleeve portion (thrust bearing gap) along with the rotation of the rotary body to lose the pressure balance between the thrust bearing gap and a space formed by another end surface of the sleeve portion, the above-mentioned lost pressure balance can be restored by active flow and circulation of the lubricating oil in the bearing device through the porous texture of the sleeve portion, that is, reciprocating movement of the lubricating oil between the thrust bearing gap and the space formed by the another end surface of the sleeve portion. Therefore, it is possible to avoid a risk of disturbing bearing performance in the thrust directions. Therefore, there can be provided the fluid dynamic bearing device with high reliability, which is capable of demonstrating and maintaining the desired bearing performance while costs are reduced by omitting the communication path. Note that, a magnitude of the oil permeability is proportional to a density (porosity) of the sleeve portion and a size of the internal pore. Therefore, if the oil permeability is too large, wear resistance on a bearing surface and oil-film formability in the bearing gap are adversely affected. Therefore, the oil permeability is preferably set to 15% or smaller.

Incidentally, sintered bearings comprise an iron-based one containing iron as a main component, a copper-based one containing copper as a main component, an iron/copper-based one containing iron and copper with iron as a main component, and a copper/iron-based one containing iron and copper with copper as a main component. The iron-based sintered bearing contains iron, which is harder than copper, as the main component, and therefore is excellent in wear resistance on the bearing surface (surface that forms the bearing gap). Further, iron, which is the main component, is hard, and hence has compression moldability inferior to that of the copper-based and copper/iron-based sintered bearings. Therefore, the oil permeability, which is proportional to (depends on) the porosity and the size of the internal pore, can be easily increased. As the oil permeability becomes higher, however, so-called "pressure relief", in which the lubricating oil present in the bearing gap is relieved into the internal pores of the sintered bearing during the rotation of the rotary body, is more likely to occur. Therefore, a stiffness of an oil film formed in the bearing gap is decreased to lower supportability. On the other hand, the copper-based and copper/iron-based sintered bearings are inferior to the iron-based sintered bearing in terms of the wear resistance on the bearing surface because copper, which is softer than iron, is contained as the main component. However, the oil film having a higher stiffness can be formed in the bearing gap because the compression molding at a higher density is possible. Thus, wear of the bearing surface due to sliding contact between the bearing surface and a contact member can be suppressed. If the compression molding is performed at a high density, however, it becomes difficult to obtain the sintered bearing having a desired oil permeability. Based on the examinations described above, in view of the configuration of the present invention, the sleeve portion is preferably obtained by sintering a green compact of raw material powder containing the iron-based powder and the copper-based powder and having an iron content larger than a copper content (that is, the iron/copper-based sintered bearing). In this manner, the sleeve portion, which has a required oil permeability and high wear resistance on the bearing surface and is excellent in oil-film formability, can be reliably obtained.

In the above-mentioned configuration, the sleeve portion can be formed by sintering the green compact of the raw material powder containing the iron-based powder having a relatively large mean particle diameter and the copper-based powder having a relatively small mean particle diameter. In this manner, the internal pores having a large diameter (coarse pores) are easily formed. Thus, the oil permeability required for the sleeve portion can be easily ensured.

In order to obtain the sleeve portion having the configuration described above, when a heating temperature (sintering temperature) of the green compact of the raw material powder containing the iron-based powder and the copper-based powder is set closer to a melting point of copper (1,083° C.), copper starts melting to accelerate alloying between iron and copper. Hence, the sleeve portion excellent in wear resistance on the bearing surface can be obtained.

On the other hand, when the alloying between iron and cooper is accelerated, the pores are formed in a portion where copper (copper-based powder) is present. Therefore, although the oil permeability of the sleeve portion is increased, the wear resistance on the bearing surface and the oil-film formability (oil-film stiffness) in the bearing gap are lowered. In consideration of the facts described above, the sleeve portion is preferably formed by heating the above-mentioned green compact at 900° C. or more to 1,083° C. or less, and is more preferably formed by heating the above-mentioned green compact at 900° C. or more to 1,000° C. or less.

In the above-mentioned configuration, in order to obtain the sleeve portion that has a desired oil permeability and high wear resistance on the bearing surface and is excellent in oil-film formability, a sintered density thereof only needs to be set to 7.0 g/cm$^3$ or smaller. Note that, if the sintered density of the sleeve portion is set too low, the oil-film formability is lowered although the oil permeability can be increased. Therefore, the sintered density is preferably set to 6.1 g/cm$^3$ or larger.

In order to enable the formation of the oil film capable of flowing through the internal pores of the sleeve portion smoothly and having a desired stiffness in the radial bearing gap and the thrust bearing gap, preferably, the lubricating oil comprises lubricating oil having a kinetic viscosity of 40 mm$^2$/s or larger at 40° C. and a kinetic viscosity of 6 mm$^2$/s or larger at 100° C.

As a specific mode of the fluid dynamic bearing device to which the above-mentioned configuration of the present invention may be suitably applied, there may be given fluid dynamic bearing device, wherein: the stationary body has a bottomed cylindrical shape with a closed end comprising a cylindrical portion and a bottom portion for closing one side of the cylindrical portion in the axial direction of the cylindrical portion, and the stationary body comprises a housing for housing the sleeve portion on an inner periphery of the cylindrical portion and a sealing member for opening another side of the sleeve portion in the axial direction of the sleeve portion to an atmosphere through a sealing gap; the rotary body comprises a shaft member having an outer periphery onto which the sleeve portion is fixed, for forming a sealing gap between the sealing member and the shaft member; the radial bearing gap is formed between an outer peripheral surface of the sleeve portion and an inner peripheral surface of the housing opposed to the outer peripheral surface of the sleeve portion, and the thrust bearing gap is formed between the end surface of the sleeve portion on the one side in the axial direction of the sleeve portion and an inner bottom surface of the housing opposed to the end surface of the sleeve portion on the one side; and an axial gap containing air is formed between the end surface of the sleeve portion on the another side in the axial direction of the sleeve portion and an end surface of the sealing member opposed to the end surface of the sleeve portion on the another side.

As in the case of the fluid dynamic bearing device having the configuration described above, if the axial gap containing air is provided between the end surface of the sleeve portion on the another side in the axial direction and the end surface of the sealing member opposed thereto under the state in which the radial bearing gap and the thrust bearing gap are filled with the lubricating oil, the amount of lubricating oil used to fill the internal space of the housing can be reduced to be smaller than a volume of the internal space of the housing. In this manner, only by implementing simple work of supplying oil to the internal space of the housing by using an appropriate oil feeding tool (a micropipette, for example) after assembly of the bearing device, a necessary amount of the lubricating oil can be provided to the internal space of the housing. Therefore, complicated work of filling the internal space of the housing and managing an oil level of the lubricating oil with high accuracy by using a complicated technology such as so-called vacuum impregnation is not required after the assembly of the bearing device. In this manner, the fluid dynamic bearing device at a low price can be realized.

In the configuration described above, if the rotary body is supported in another thrust direction by exerting an external force for pushing the sleeve portion to the one side in the axial direction, the rotary body is supported in both thrust directions. Hence, it is possible to avoid as much as possible a risk that load supportability in the one thrust direction by the thrust bearing portion becomes excessively high to disturb support accuracy for the rotary body in the thrust directions. The above-mentioned external force can be applied as, for example, a magnetic force. The magnetic force can be applied by arranging a stator coil provided to the stationary body and a rotor magnet provided to the rotary body so as to be shifted in the axial direction. Various motors, into which this type of fluid dynamic bearing device is built in, comprises the rotor magnet and the stator coil as indispensable constituent members. Therefore, by applying the magnetic force as the above-mentioned external force, the fluid dynamic bearing device excellent in supportability in the thrust directions can be obtained at a low price.

In the above-mentioned configuration, the fluid dynamic bearing device may further comprise a pushing portion for pushing, during rotation of the rotary body, the lubricating oil in the axial gap in a direction radially away from the sealing gap. With this, not only leakage of the lubricating oil through the sealing gap during the rotation of the rotary body, but also resultant deterioration in bearing performance can be prevented as much as possible. For example, the pushing portion may comprise a plurality of groove portions formed in at least one of the two opposed surfaces forming the axial gap. However, in view of satisfactory processability of the sleeve portion made of the sintered metal, it is desired that the pushing portion comprise a plurality of groove portions formed in the end surface of the sleeve portion on the another side in the axial direction.

It is desired that a groove width of each of the plurality of groove portions of the pushing portion be gradually reduced in a direction radially away from the sealing gap. This is because a capillary force is generated to facilitate the lubricating oil in the axial gap to be retained at a position radially spaced apart from the sealing gap, which is advantageous in preventing the leakage of the lubricating oil through the sealing gap. Further, it is desired that the each of the plurality of the groove portions of the pushing portion have such a sectional shape that the groove width is gradually reduced toward a groove bottom side. This is because a capillary force is generated to allow the lubricating oil in the axial gap to be drawn to the groove bottom side of the plurality of groove portions (side spaced axially apart from the sealing gap), which is further advantageous in preventing the leakage of the lubricating oil through the sealing gap.

In the above-mentioned configuration, if the sealing gap is formed between an outer peripheral surface of a shaft member having the sleeve portion fixed onto an outer periphery thereof and an inner peripheral surface of the sealing member formed integrally with or separately from the housing, the radial bearing gap can be formed on a radially outer side with respect to the sealing gap. Thus, when the pushing portion comprises the plurality of groove portions, and the groove width of the each of the plurality of groove portions is gradually reduced in the direction radially away from the sealing gap, the lubricating oil filled in the axial gap is more easily drawn into the radial bearing gap when the rotary body comprising the sleeve portion is stopped and rotated. With this, the radial bearing gap can be filled with an ample amount of the lubricating oil, and rotational accuracy in the radial direction can be stabilized.

As described above, the fluid dynamic bearing device according to the one embodiment of the present invention has the above-mentioned various features. Thus, the fluid dynamic bearing device can be suitably used by being built in various motors such as a fan motor for PCs and a spindle motor for disk drives, and can also contribute to cost reduction of those various motors.

Advantageous Effects of Invention

As described above, according to the one embodiment of the present invention, it is possible to provide the fluid dynamic bearing device with high reliability, which is capable of demonstrating and maintaining the desired bearing performance while costs can be further reduced by omitting the communication path.

DESCRIPTION OF EMBODIMENTS

Now, description is made of embodiments of the present invention with reference to the drawings.

Figure 1:
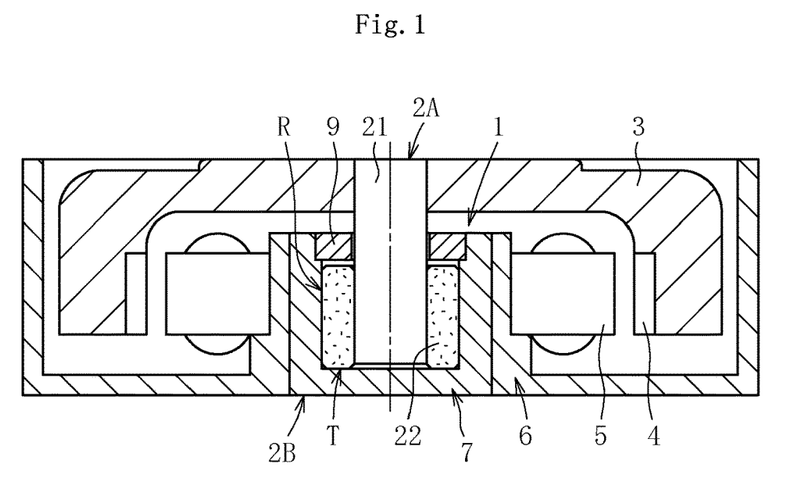
FIG. 1 is a sectional view for conceptually illustrating a configuration example of a fan motor.

FIG. 1 schematically illustrates a structural example of a fan motor having built therein a fluid dynamic bearing device 1 according to the present invention. The fan motor illustrated in FIG. 1 comprises the fluid dynamic bearing device 1, a motor base 6, stator coils 5 fixed to the motor base 6, a rotor 3 comprising blades (not shown), and a rotor magnet 4 being fixed to the rotor 3 and facing the stator coils 5 across a radial gap. A housing 7 of the fluid dynamic bearing device 1 is fixed to an inner periphery of the motor base 6, and the rotor 3 is fixed to one end of a shaft member 21 of the fluid dynamic bearing device 1. In the fan motor having such a structure, when the stator coils 5 are energized, an electromagnetic force is generated between the stator coils 5 and the rotor magnet 4 so as to cause the rotor magnet 4 to rotate. In conjunction therewith, a rotary body 2A comprising the shaft member 21, the rotor 3 fixed to the shaft member 21, and the rotor magnet 4 fixed to the rotor 3 is rotated with respect to a stationary body 2B comprising the stator coils 5, the housing 7, and the motor base 6 fixing the stator coils 5 and the housing 7.

Note that, when the rotary body 2A is rotated, air is blown upward or downward in FIG. 1 depending on a form of the blades formed on the rotor 3. Thus, during rotation of the rotary body 2A, a reactive force of this blowing action is applied as an upward or downward thrust force in FIG. 1 to the shaft member 21 of the fluid dynamic bearing device 1 and a bearing member 22 as a sleeve portion fixed to its outer periphery. In a region between the stator coils 5 and the rotor magnet 4, a magnetic force (repulsive force) is applied in a direction in which the thrust force is counterbalanced. A thrust load, which is generated by a difference in magnitude between the thrust force and the magnetic force, is supported by a thrust bearing portion T of the fluid dynamic bearing device 1. The magnetic force in the direction in which the thrust force is counterbalanced can be generated, for example, by arranging the stator coils 5 and the rotor magnet 4 with a shift in the axial direction (not shown in detail). Further, during the rotation of the rotary body 2A, a radial load is applied to the shaft member 21 and the bearing member 22 of the fluid dynamic bearing device 1. This radial load is supported by a radial bearing portion R of the fluid dynamic bearing device 1.

Figure 2:
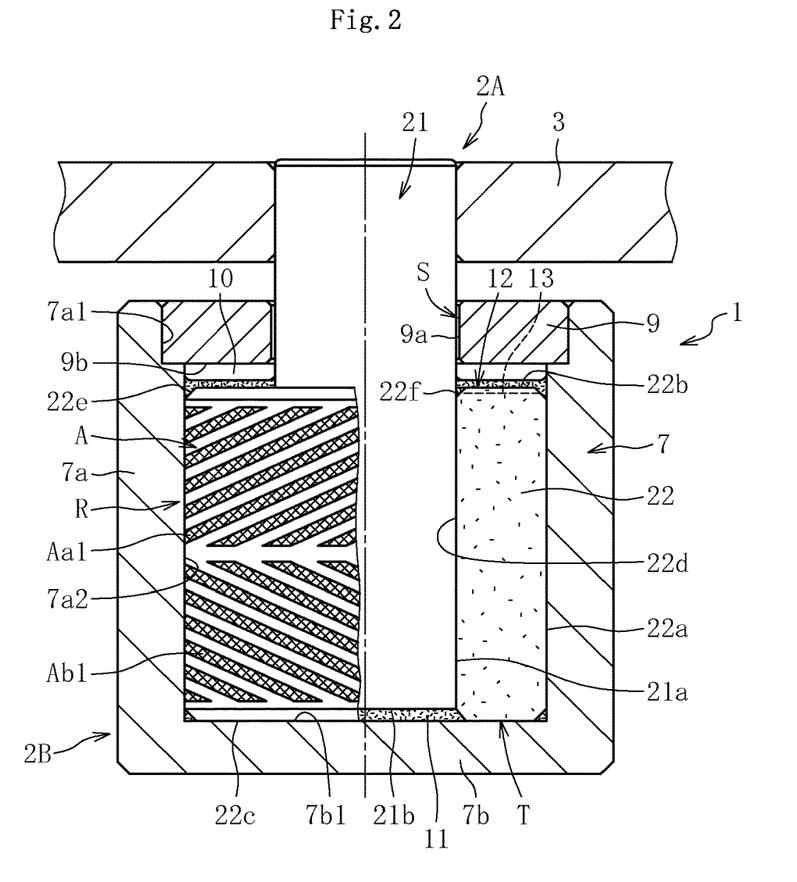
FIG. 2 is a sectional view for illustrating a fluid dynamic bearing device according to a first embodiment of the present invention.

FIG. 2 illustrates the fluid dynamic bearing device 1 according to a first embodiment of the present invention. This fluid dynamic bearing device 1 comprises, as main components, the shaft member 21, the bearing member 22 fixed to its outer periphery, the housing 7 that has a bottomed cylindrical shape closed on one side in the axial direction and is configured to receive the shaft member 21 and the bearing member 22 on its inner periphery, and a sealing member 9 fixed to the inner periphery of the housing 7. An interior space of the housing 7 is filled with lubricating oil 11 (indicated by densely dotted hatching). Under the state illustrated in FIG. 2, at least an internal pore of the bearing member 22 made of sintered metal, a radial bearing gap in the radial bearing portion R, and a thrust bearing gap in the thrust bearing portion T are filled with the lubricating oil 11. Note that, for the sake of convenience of description, a side on which the sealing member 9 is arranged is hereinafter referred to as upper side, and an opposite side in the axial direction is hereinafter referred to as lower side.

The housing 7 has the bottomed cylindrical shape comprising a circular cylindrical portion 7a and a bottom portion 7b closing a lower end opening of the cylindrical portion 7a. In this case, the cylindrical portion 7a and the bottom portion 7b are integrally made of a metal or a resin. An inner peripheral surface of the cylindrical portion 7a has a large-diameter inner peripheral surface 7a1 and a small-diameter inner peripheral surface 7a2. The sealing member 9 is fixed to the large-diameter inner peripheral surface 7a1. The radial bearing gap is formed between a cylindrical region of the small-diameter inner peripheral surface 7a2 and an outer peripheral surface 22a of the bearing member 22 fixed to the shaft member 21. This cylindrical region is formed into an even and smooth surface. Further, the thrust bearing gap is formed between an annular region of an inner bottom surface 7b1 of the bottom portion 7b and a lower end surface 22c of the bearing member 22. This annular region is formed into an even and smooth surface.

The sealing member 9 is obtained by forming a metal or a resin into an annular shape, and fixed to the large-diameter inner peripheral surface 7a1 of the housing 7 by appropriate means such as bonding, press fitting, and press-fit bonding. The sealing gap (labyrinth seal) S is formed between an inner peripheral surface 9a of the sealing member 9 and an outer peripheral surface 21a of the shaft member 21 opposed thereto. An upper side of the bearing member 22 is open to the atmosphere through the sealing gap S.

The shaft member 21 is made of a metal material such as stainless steel, and the outer peripheral surface 21a thereof is formed into a smooth cylindrical surface. The rotor 3 having the blades is fixed to an outer periphery of an upper end of the shaft member 21.

The bearing member 22 as the sleeve portion is obtained by forming a porous body of a sintered metal into a cylindrical shape. The bearing member 22 is fixed to the outer peripheral surface 21a of the shaft member 21 by appropriate means such as press fitting, bonding, press-fit bonding (combination of press fitting and bonding), and welding in a manner that the lower end surface 22c is located on an outside (lower side) in the axial direction with respect to a lower end surface 21b of the shaft member 21.

On the outer peripheral surface 22a of the bearing member 22, there is formed a cylindrical radial bearing surface for forming the radial bearing gap in the radial bearing portion R between the cylindrical radial bearing surface and the small-diameter inner peripheral surface 7a2 of the housing 7 opposed thereto. On the radial bearing surface, there is formed a radial dynamic pressure generating portion A for causing a dynamic pressure generating action in the lubricating oil 11 present in the radial bearing gap. The radial dynamic pressure generating portion A comprises a plurality of dynamic pressure generating grooves Aa1 and Ab1 that are arrayed in a herringbone pattern and convex hill portions that define and form the dynamic pressure generating grooves Aa1 and Ab1. Specifically, the dynamic pressure generating grooves Aa1 and Ab1 are inclined in directions opposite to each other and spaced apart from each other in the axial direction. In this embodiment, an axial dimension of the upper dynamic pressure generating grooves Aa1 is set equal to an axial dimension of the lower dynamic pressure generating grooves Ab1. This dimensional setting is to prevent the lubricating oil 11 in the radial bearing gap from being pumped downward (to a thrust bearing gap side in the thrust bearing portion T) during the rotation of the rotary body 2A so as to prevent a pressure of the lubricating oil 11 in the thrust bearing gap from being excessively high with the pushing. The radial dynamic pressure generating portion A may alternatively comprise dynamic pressure generating grooves in a spiral pattern arranged at predetermined intervals in a circumferential direction and convex hill portions that define and form the dynamic pressure generating grooves.

Figure 3:
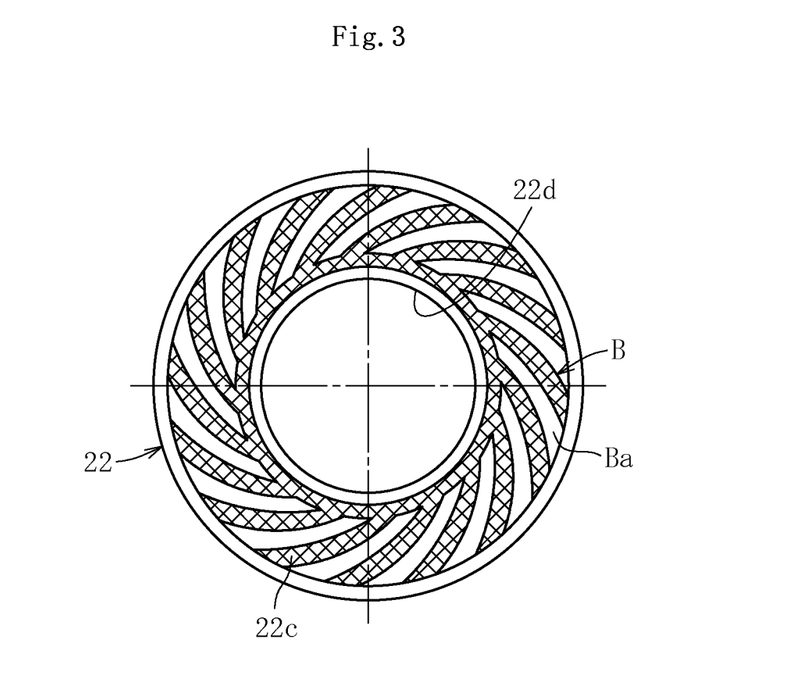
FIG. 3 is a plan view for illustrating a lower end surface of a bearing member illustrated in FIG. 2.

As illustrated in FIG. 3, on the lower end surface 22c of the bearing member 22, there is formed an annular thrust bearing surface for forming the thrust bearing gap in the thrust bearing portion T between the annular thrust bearing surface and the inner bottom surface 7b1 of the housing 7 opposed thereto. On the thrust bearing surface, there is formed a thrust dynamic pressure generating portion B for causing a dynamic pressure generating action in the lubricating oil 11 in the thrust bearing gap along with the rotation of the rotary body 2A. The thrust dynamic pressure generating portion B comprises dynamic pressure generating grooves Ba formed in a spiral pattern and convex hill portions that define and form the dynamic pressure generating grooves Ba, which are arranged alternately in the circumferential direction. The dynamic pressure generating grooves Ba may be arranged in a herringbone pattern.

In a region between the upper end surface 22b of the bearing member 22 and a lower end surface 9b of the sealing member 9 opposed thereto, an axial gap (annular space) 10 containing air is formed. A gap width of the axial gap 10 is sufficiently larger than a gap width of the thrust bearing gap in the thrust bearing portion T. Under a state in which the fluid dynamic bearing device 1 is arranged in a posture illustrated in FIG. 2 (state in which the sealing gap S is arranged on the upper side), an oil level of the lubricating oil 11 filled in the interior space of the housing 7 is maintained within a range of the axial gap 10.

Thus, in the fluid dynamic bearing device 1, an amount (volume) of the lubricating oil 11 filled in the interior space of the housing 7 is smaller than a volume of the interior space of the housing 7.

Figure 4:
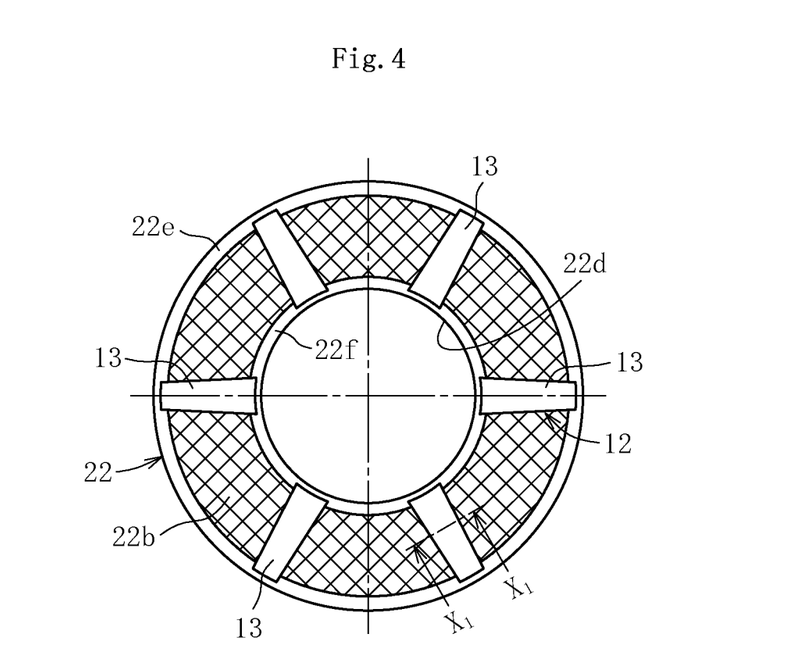
FIG. 4 is a plan view for illustrating an upper end surface of the bearing member illustrated in FIG. 2.
Figure 5A:
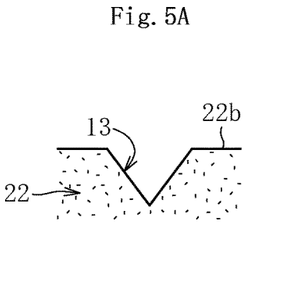
FIG. 5A is a sectional view taken along the line X1-X1 in FIG. 4 as viewed in a direction of the arrows, for illustrating an example of a groove portion formed on the upper end surface of the bearing member.
Figure 5B:
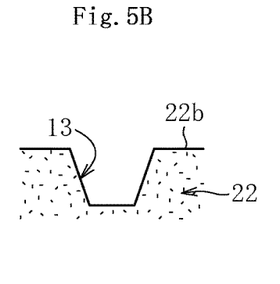
FIG. 5B is a diagram for illustrating a variation of the groove portion.
Figure 5C:
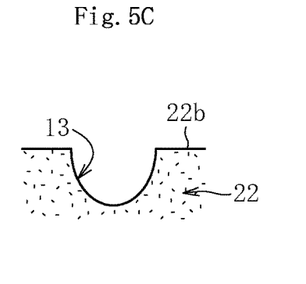
FIG. 5C is a diagram for illustrating a further variation of the groove portion.

On the upper end surface 22b of the bearing member 22, there is formed a pushing portion 12 for pushing, during the rotation of the rotary body 2A, the lubricating oil 11 in the axial gap 10 in a direction radially away from the sealing gap S (radially outer side in this embodiment). As illustrated in FIG. 4, in the pushing portion 12, a plurality of groove portions 13 are arranged at a predetermined interval in the circumferential direction. In this embodiment, the groove portions 13 comprise radial grooves extending in the radial direction. The groove portions 13 each have a form gradually reduced in groove width toward the radially outer side, and have such a sectional shape that the groove width is gradually reduced toward a groove bottom side. Note that, as the sectional shape of the groove portions 13, there may be employed not only the triangular shape in cross-section illustrated in FIG. 5A but also, for example, the trapezoidal shape in cross-section illustrated in FIG. 5B, or the semi-circular shape in cross-section illustrated in FIG. 5C.

A radially outer end portion and a radially inner end portion of each of the groove portions 13 are open respectively in an upper end outer circumferential chamfer 22e and an upper end inner circumferential chamfer 22f of the bearing member 22, and a groove depth of the groove portions 13 is set to be smaller than a chamfering amount of the upper end outer circumferential chamfer 22e. This is because, when the groove depth of the groove portions 13 is larger than the chamfering amount of the upper end outer circumferential chamfer 22e, the radial dynamic pressure generating portion A formed on the outer peripheral surface 22a of the bearing member 22 (in particular, the upper dynamic pressure generating grooves Aa1) may be deformed, and supportability of the radial bearing portion R may be adversely affected.

The bearing member 22 having the above-mentioned configuration is made of a sintered metal containing iron and copper as main components, more specifically, an iron/copper-based sintered metal that contains a larger amount of iron than that of copper (copper has a larger weight ratio than that of iron) and has an oil permeability of 4% or higher for a mass flow rate of the lubricating oil 11 flowing along the thrust dynamic pressure generating portion B (dynamic pressure generating grooves Ba) during the rotation of the rotary body 2A. The rate of iron and the rate of copper in the bearing member 22 are set to 60% or larger and 40% or smaller in weight ratio, respectively, and are substantially set to 70% and 30% in this case.

Figure 6:
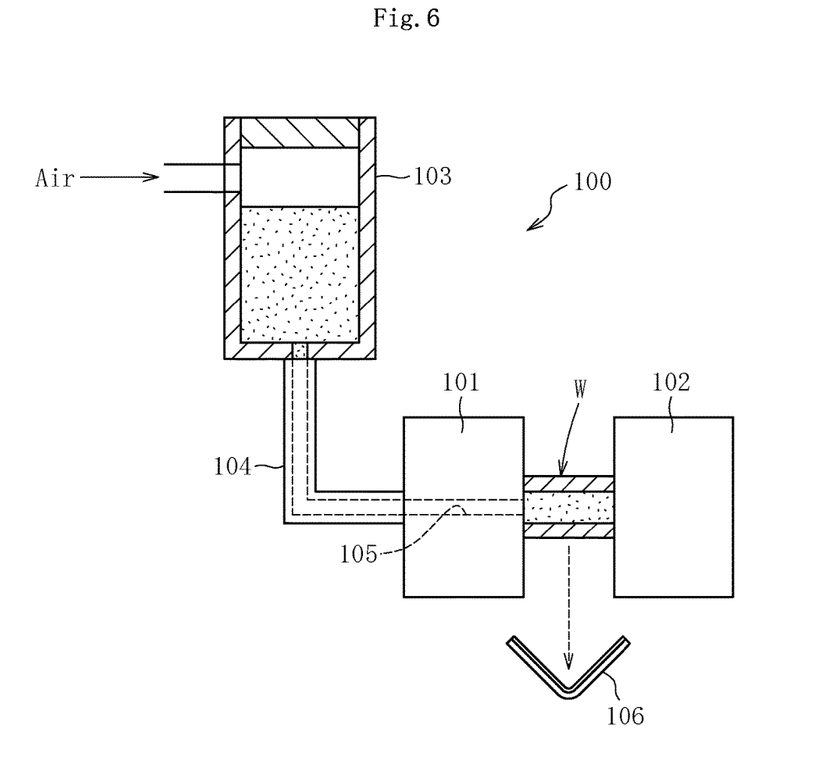
FIG. 6 is a schematic diagram of a testing device for measuring an oil permeability.

Here, the oil permeability is a parameter [unit: g/10 min] for quantitatively indicating the amount of oil (lubricating oil) that is enabled to flow through the bearing member 22 made of the sintered metal by means of a porous texture and can be measured by using a testing device 100 as illustrated in FIG. 6. The testing device 100 illustrated in the drawing comprises holding portions 101 and 102, each having a cylindrical shape, which sandwich and fix a sample W having a cylindrical shape (the bearing member made of the sintered metal in this case) on both sides in the axial direction, a tank 103 for storing oil therein, and a pipe 104 for supplying the oil stored in the tank 103 to the holding portion 101. Portions between both ends of the sample W in the axial direction and the holding portions 101 and 102 are sealed by sealing bodies (not shown; rubber washers, for example). In the configuration described above, a pressurizing force of 0.4 MPa is applied to the oil (the same kind of lubricating oil as the lubricating oil that fills the internal space of the fluid dynamic bearing device 1) stored in the tank 103 under a room-temperature (from 26° C. to 27° C.) environment so that the lubricating oil is continuously supplied to an axial through hole formed in the sample W through an inner flow path of the pipe 104 and an inner flow path 105 of the holding portion 101 for ten minutes. Below the sample W, an oil absorbing body (paper or cloth, for example) 106 is arranged. When the lubricating oil is supplied to the sample W in the above-mentioned mode, the oil exuded and dropping from a surface opening of the sample W, which is formed on an outer diameter surface, is collected by the oil absorbing body 106. Then, the oil permeability is calculated from a difference in weight of the oil absorbing body 106 before and after the test.

The bearing member 22 having the configuration described above can be obtained mainly through a compression molding step, a heating step, and a groove forming step in the stated order. Each of the above-mentioned steps is described below in detail.

[Compression Molding Step]

In the compression molding step, raw material powder containing iron-based powder and copper-based powder is subjected to compression molding to obtain a green compact having a shape close to the bearing member 22. In this embodiment, a weight ratio of iron and copper in the bearing member 22 is iron:copper≈7:3. Therefore, as the raw material powder, raw material powder containing the iron-based powder and the copper-based powder substantially at 70% and 30% in weight ratio is used. As the iron-based powder contained in the raw material powder, iron-based powder having a mean particle diameter larger than that of the copper-based powder is used.

As the iron-based powder to be contained in the raw material powder described above, iron-based powder obtained by mixing first iron-based powder including particles, each having a diameter (maximum diameter) of 45 µm or smaller, at 80% in weight ratio and second iron-based powder including particles, each having a diameter of 45 µm or smaller, at from 10% to 25% in weight ratio, so as to have the rate of the first iron-based powder and the rate of the second iron-based powder to the whole iron-based powder are respectively set to 33% and 67% in weight ratio can be used. Further, as the copper-based powder to be contained in the above-mentioned raw material powder, copper-based powder obtained by mixing first copper-based powder including particles, each having a diameter of 45 µm or smaller, at 55% to 75% in weight ratio and second copper-based powder including particles, each having a diameter of 45 µm or smaller, at 55% to 90% in weight ratio, so as to have the rate of the first copper-based powder and the rate of the second copper-based powder to the whole copper-based powder are respectively set to 71% and 29% in weight ratio can be used.

As described above, the green compact is obtained by using the raw material powder containing a larger amount of the iron-based powder than that of the copper-based powder and containing the iron-based powder having a larger mean particle diameter than that of the copper-based powder. As a result, the bearing member 22 made of the sintered metal having higher wear resistance on the radial bearing surface and the thrust bearing surface and the required oil permeability, which is excellent in oil-film formability in the radial bearing gap and the thrust bearing gap, can be more easily obtained.

[Heating Step]

In the heating step, the green compact obtained in the above-mentioned compression molding step is heated to form a sintered compact as a result of sintering (neck bonding) of metal particles forming the green compact. A sintering (heating) temperature of the green compact is preferably set to from 900° C. to 1,083° C. (melting point of copper), more preferably, from 900° C. to 1,000° C. The reason is as flows. When the heating temperature of the above-mentioned green compact is set closer to the melting point of copper, copper starts melting to accelerate alloying between iron and copper. Therefore, the bearing member 22 excellent in wear resistance on the radial bearing surface (radial dynamic pressure generating portion A) and the thrust bearing surface (thrust dynamic pressure generating portion B) can be formed. On the other hand, if the sintering temperature is increased to accelerate the alloying between iron and copper, pores are formed in a portion where copper (copper-based powder) is present in a state of the green compact. Therefore, although the oil permeability of the bearing member 22 can be increased, the wear resistance on the bearing surfaces and thus the oil-film formability in the radial bearing gap and the thrust bearing gap are lowered. Therefore, the heating temperature of the green compact is preferably set in a range of from 900° C. to 1,083° C., for example, to 950° C. In this manner, the sintered compact and thus the bearing member 22, which have good oil permeability, wear resistance on the bearing surfaces, and oil-film formability in the bearing gaps, can be obtained. A sintered density of the thus formed sintered compact is from 6.1 g/cm$^3$ to 7.0 g/cm$^3$.

[Groove Forming Step]

In the groove forming step, for example, press working or machining is performed on the sintered compact to form the radial dynamic pressure generating portion A, the thrust dynamic pressure generating portion B, and the pushing portion 12 (groove portions 13) on the sintered compact, thereby completing the bearing member 22 illustrated in FIG. 2 and the like. The radial dynamic pressure generating portion A, the thrust dynamic pressure generating portion B, and the pushing portion 12 can also be die-molded simultaneously with the formation of the green compact in the compression molding step. In this case, the groove forming step is not required. Further, even when the radial dynamic pressure generating portion A, the thrust dynamic pressure generating portion B, and the pushing portion 12 are formed on an opposed surface, the groove forming step is not required.

The fluid dynamic bearing device 1 according to this embodiment has the configuration described above and is completed, for example, by inserting the shaft member 21 and the bearing member 22 fixed to its outer periphery along the inner periphery of the housing 7, fixing the sealing member 9 to the large-diameter inner peripheral surface 7a1 of the housing 7, and then filling (injecting) the lubricating oil 11 to the interior space of the housing 7 through the sealing gap S with an oil dispenser such as a micropipette. As the lubricating oil 11, ester-based lubricating oil having a kinetic viscosity of 40 mm$^2$/s or higher at 40° C. and a kinetic viscosity of 6 mm$^2$/s or higher at 100° C. is used.

In the fluid dynamic bearing device 1 constructed as described above, along with the rotation of the rotary body 2A having the shaft member 21 and the bearing member 22, the radial bearing gap is formed between the radial bearing surface formed on the outer peripheral surface 22a of the bearing member 22 and the small-diameter inner peripheral surface 7a2 of the housing 7 opposed thereto. Then, along with the rotation of the rotary body 2A, a pressure of an oil film of the lubricating oil formed in the radial bearing gap is increased by the dynamic pressure generating action in the radial dynamic pressure generating portion A, and the radial bearing portion R in which the rotary body 2A is supported in a non-contact manner in the radial direction is formed. Simultaneously, the thrust bearing gap is formed between the thrust bearing surface formed on the lower end surface 22c of the bearing member 22 and the inner bottom surface 7b1 of the housing 7 opposed thereto. Then, along with the rotation of the rotary body 2A, a pressure of an oil film in the thrust bearing gap is increased by the dynamic pressure generating action in the thrust dynamic pressure generating portion B, and the thrust bearing portion T in which the rotary body 2A is supported in a non-contact manner in one of thrust directions (supported upward in a floating manner) is formed.

In the fluid dynamic bearing device 1 according to the present invention, when the rotary body 2A rotates to cause the dynamic pressure generating action in the lubricating oil 11 present in the thrust bearing gap, the lubricating oil in the thrust bearing gap is collected in one region of the thrust bearing gap to generate a positive pressure. In the positive pressure portion, the lubricating oil 11 flows back into the bearing member 22 made of the sintered metal. At this time, the bearing member 22 has the oil permeability of 4% or higher with respect to the mass flow rate of the lubricating oil 11 in the thrust bearing gap, which flows along the thrust dynamic pressure generating portion B (dynamic pressure generating grooves Ba). As a result, in the above-mentioned positive-pressure portion, the lubricating oil 11 actively flows back into the bearing member 22. Therefore, it is possible to effectively suppress a risk that the pressure of the lubricating oil in the thrust bearing gap becomes excessively high to excessively float upward (move up) the rotary body 2A. In addition, in this embodiment, as described referring to FIG. 1, a magnetic force as an external force for pushing down the rotary body 2A is caused to act on the rotary body 2A having the shaft member 21 and the bearing member 22. Therefore, the rotary body 2A can be further effectively prevented from being excessively floated. Hence, it is possible to avoid as much as possible a risk that load supportability in the one thrust direction due to the dynamic pressure generating action of the lubricating oil 11, which is caused in the thrust bearing gap, becomes excessively higher to disturb support accuracy (rotational accuracy) in the thrust directions.

In the above-mentioned mode, in parallel to the backflow of the lubricating oil 11 into the bearing member 22 in the above-mentioned mode, the lubricating oil 11 continuously exudes out on the lower end surface 22c of the bearing member 22 into the thrust bearing gap. Further, when the rotary body 2A rotates to cause the dynamic pressure generating action in the lubricating oil 11 present in the radial bearing gap, the lubricating oil in the radial bearing gap is collected in the region of the radial bearing gap to generate the positive pressure in the same manner as described above. In the positive pressure portion, the lubricating oil 11 flows back into the bearing member 22. In parallel to the backflow, the lubricating oil 11 continuously exudes out on the outer peripheral surface 22a of the bearing member 22 into the radial bearing gap. Therefore, the radial bearing gap and the thrust bearing gap can be filled with the abundant lubricating oil 11 so as to stably demonstrate the bearing performance of the radial bearing portion R and the thrust bearing portion T over a long period of time.

Further, in the fluid dynamic bearing device 1 according to this embodiment, in the situation where the radial bearing gap and the thrust bearing gap are filled with the lubricating oil 11 (FIG. 2), the axial gap 10 containing air is formed between the upper end surface 22b of the bearing member 22 and the lower end surface 9b of the sealing member 9 opposed thereto. In other words, in the above-mentioned situation, the oil level of the lubricating oil 11 can be maintained within the range of the axial gap 10. In this case, the amount of the lubricating oil 11 filled in the interior space of the housing 7 can be reduced to be smaller than the volume of the interior space of the housing 7. With this, only by carrying out a simple operation of oil injection to the interior space of the housing 7 through the sealing gap S with the oil dispenser such as the micropipette after assembly of the bearing device 1, a necessary amount of the lubricating oil 11 can be filled in the interior space of the housing 7. As a result, the oil level need not be managed with high accuracy. Note that, an oil level of the lubricating oil 11 is maintained within the axial gap 10, and hence the operation of oil injection to the interior space of the housing 7 may be carried out prior to fixation of the sealing member 9 to the housing 7. With this, the operation of oil injection can be simplified in comparison with that in the case where the lubricating oil 11 is filled into the interior space of the housing 7 after the fixation of the sealing member 9.

In the configuration of the fluid dynamic bearing device 1 according to this embodiment, for example, in a case where the bearing device 1 in the posture illustrated in FIG. 2 is used upside down, the lubricating oil 11 is somewhat more liable to leak out to an outside through the sealing gap S. As described above, such a problem can be effectively prevented, for example, by taking the measures of (1) forming the pushing portion 12 for pushing, during the rotation of the shaft member 21 and the bearing member 22, the lubricating oil 11 in the axial gap 10 in the direction radially away from the sealing gap S (radially outer side in this embodiment), (2) forming the pushing portion 12 with the plurality of groove portions 13 that are formed in the upper end surface 22a of the bearing member 22, and gradually reducing the groove width of the groove portions 13 in a direction radially away from the sealing gap S, and (3) forming the groove portions 13 of the pushing portion 12 into such a sectional shape that the groove width is gradually reduced toward the groove bottom side. Specifically, when the measure (2) is taken, a capillary force is generated to facilitate the lubricating oil 11 in the axial gap 10 to be retained at a position radially spaced apart from the sealing gap S. Further, when the measure (3) is taken, a capillary force is generated to allow the lubricating oil in the axial gap 10 to be drawn to the groove bottom side of the groove portions 13 (side spaced axially apart from the sealing gap S).

Although not shown, in order to more effectively prevent the leakage of the lubricating oil through the sealing gap S, an oil repellent film may be formed on the outer peripheral surface 21a of the shaft portion 21 or an upper end surface of the sealing member 9, which is adjacent to the sealing gap S and exposed to the atmosphere.

Further, as in this embodiment, when the sealing gap S is formed between the outer peripheral surface 21a of the shaft member 21 and the inner peripheral surface 9a of the sealing member 9 fixed to the housing 7, and the radial bearing gap is formed between the outer peripheral surface 22a of the bearing member 22 fixed to the outer periphery of the shaft member 21 and the small-diameter inner peripheral surface 7a2 of the housing 7 opposed thereto, the radial bearing gap can be formed on the radially outer side with respect to the sealing gap S. In addition, the pushing portion 12, which comprises the plurality of groove portions 13 in the form described above and is formed on the upper end surface 22b of the bearing member 22, facilitates the lubricating oil 11 filled in the axial gap 10 to be drawn into the radial bearing gap in the radial bearing portion R when the rotary body 2A having the shaft member 2 and the bearing member 22 is stopped and rotated. With this, the radial bearing gap can be always filled with an ample amount of the lubricating oil 11, and thus rotational accuracy in the radial direction can be stabilized.

The fluid dynamic bearing device 1 according to the embodiment of the present invention is described above, and various modifications may be made to each part of the fluid dynamic bearing device 1 without departing from the gist of the present invention.

Figure 7:
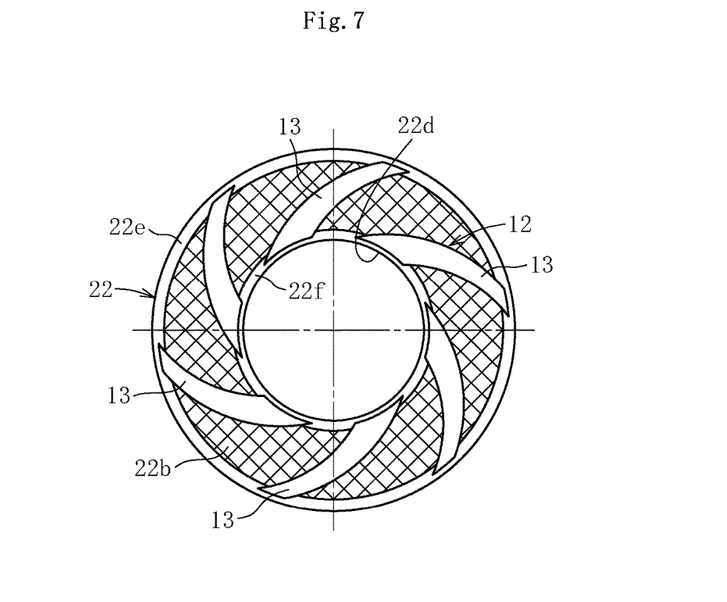
FIG. 7 is a plan view for illustrating the upper end surface of the bearing member according to a variation.

For example, the plurality of groove portions 13 of the pushing portion 12 may be formed in a spiral pattern as illustrated in FIG. 7. The groove portions 13 in the spiral pattern each have a cross-sectional area (volume) larger than that of each of the radial groove portions 13 illustrated in FIG. 4. Thus, a larger amount of the lubricating oil 11 can be retained in the axial gap 10, which is advantageous in enhancing bearing performance.

Further, although not shown, the radial bearing portion for supporting the rotary body 2A having the shaft member 21 and the bearing member 22 in the radial direction can be provided at two positions spaced apart in the axial direction. In this manner, torque reduction and improvement of supportability (in particular, moment rigidity) in the radial direction can be simultaneously achieved.

Further, in the housing 7 used in the embodiment described above, the cylindrical portion 7a and the bottom portion 7b closing the lower end opening of the cylindrical portion 7a are formed integrally with each other, and the sealing gap S sealing an upper end opening of the housing 7 is formed with the inner peripheral surface 9a of the sealing member 9 fixed to the inner peripheral surface of the housing 7. However, as the housing 7 to be used herein, the cylindrical portion 7a and the bottom portion 7b closing the lower end opening of the cylindrical portion 7a may be arranged as separate members. In this case, the sealing member that forms the sealing gap S between the sealing member and the outer peripheral surface 21a of the shaft portion 21 can be formed integrally with the cylindrical portion 7a (not shown).

Still further, in the embodiment described above, the housing 7 provided separately from the motor base 6 is fixed to the inner periphery of the motor base 6. However, a part corresponding to the motor base 6 may be formed integrally with the housing 7 (not shown).

Yet further, in the embodiment described above, the radial dynamic pressure generating portions A is formed on the outer peripheral surface 22a of the bearing member 22 in view of satisfactory processability of the bearing member 22 made of a sintered metal. However, the radial dynamic pressure generating portion A may be formed on the inner peripheral surface 7a2 of the housing 7 opposed thereto. In addition, the radial bearing portion may be formed of fluid dynamic bearings of other publicly known types, such as what is called a multi-lobe bearing, a step bearing, and a wave bearing. Similarly, the thrust dynamic pressure generating portion B need not be formed on the lower end surface 22c of the bearing member 22 but may be formed on the inner bottom surface 7b1 of the housing 7 opposed thereto. Further, the thrust bearing portion T may be formed of fluid dynamic bearings of other publicly known types, such as what is called a step bearing and a wave bearing.

Yet further, in the embodiment described above, the rotor magnet 4 and the stator coils 5 are arranged with a shift in the axial direction so that the external force (magnetic force) for forcing the bearing member 22 and the shaft member 21 downward (supporting the bearing member 22 and the shaft member 21 in the another thrust direction) is applied to the rotary body 2 comprising the bearing member 22. However, means for applying such an external force to the rotary body 2A is not limited to that in the above description. For example, although not shown, a magnetic member may be arranged so as to face the rotor magnet 4 in the axial direction so that the magnetic force is applied to the rotary body 2A. Alternatively, in a case where the thrust force serving as the reactive force of the blowing action is great enough to cause the rotary body 2A having the bearing member 22 to be forced downward due to the thrust force alone, the magnetic force (magnetic attraction force) serving as the external force for forcing the rotary body 2A downward need not be generated.

Figure 9:
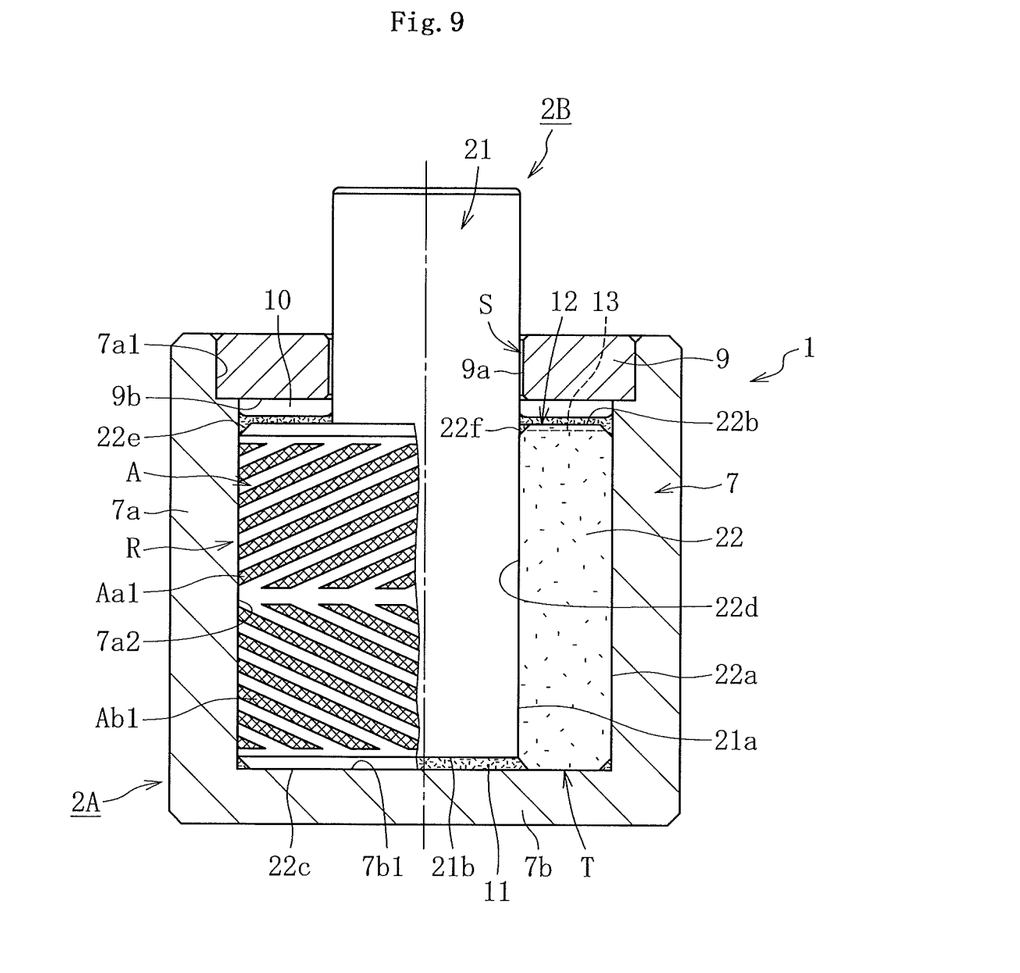
FIG. 9 is a sectional view for illustrating a fluid dynamic bearing device according to a second embodiment of the present invention.

Moreover, as described above, the present invention is preferably applicable not only to the fluid dynamic bearing device 1 including the shaft member 21 and the bearing member 22 formed on the side of the rotary body 2A and the housing 7 arranged on the side of the stationary body 2B but also to the fluid dynamic bearing device 1, as illustrated in FIG. 9, including the shaft member 21 and the bearing member 22 formed on the stationary body 2B and the housing 7 arranged on the side of the rotary body 2A. In sum, the present invention is preferably applicable to any structure as long as a bearing device has a structure comprising the thrust bearing gap in the thrust bearing portion formed of the fluid dynamic bearing, which is formed only on one side of the bearing member 22 made of the sintered metal in the axial direction, in which the pressure balance of the lubricating oil is easily lost between the space (thrust bearing gap) formed on the one side of the bearing member 22 in the axial direction and the space formed on the another side in the axial direction.

Yet further, in the case described above, the present invention is applied to the fluid dynamic bearing device 1 in which the rotor 3 comprising the blades is fixed to the shaft member 21. However, the present invention is preferably applicable also to a fluid dynamic bearing device 1 in which a disk hub having a disk mounting surface or a polygonal mirror is fixed to the shaft member 21. In other words, the present invention is preferably applicable not only to the fluid dynamic bearing device 1 built in the fan motor as illustrated in FIG. 1 but also to a fluid dynamic bearing device 1 built in other electrical-apparatus motors such as a spindle motor for disk drives, and a polygon scanner motor for laser beam printers.

EXAMPLES

In order to demonstrate the utility of the present invention, there was comparatively verified the degree of difference in floating amount of the rotary body 2A between a case (related-art example) where a bearing member made of a sintered metal (bearing member made of a copper/iron-based sintered metal) without the configuration of the present invention was used and a case (Examples 1 and 2) where the bearing member made of the sintered metal (bearing member made of an iron/copper-based sintered metal) having the configuration according to the present invention was used. A size of the bearing member, a rotation speed of the rotary body, and used lubricating oil in a comparative test were as follows for both the related-art example and Examples.

Bearing member size: outer diameter×inner diameter×total length=4.7×1.8×2.2 [mm]

Rotating speed of the rotary body: 8,000 [rpm]

Lubricating oil: ester-based lubricating oil having a kinetic viscosity of 45 mm$^2$/s at 40° C. and a kinetic viscosity of 8 mm$^2$/s at 100° C.

Further, a thrust dynamic pressure generating portion C as illustrated in FIG. 3 was formed on the one end surface of the bearing member in the axial direction (the lower end surface 22c illustrated in FIG. 2) according to the related-art example and Examples 1 and 2.

The bearing members made of the sintered metal according to Examples 1 and 2 and the related-art example were manufactured as follows.

Examples 1 and 2

The raw material powder containing the iron-based powder and the copper-based powder substantially respectively at 70% and 30% in weight ratio was used. In the raw material powder, iron-based powder obtained by mixing first iron-based powder including particles, each having a diameter of 45 μm or smaller, at 80% or larger in weight ratio and second iron-based powder including particles, each having a diameter of 45 μm or smaller, at from 10% to 25% in weight ratio, in which the rate of the first iron-based powder and the rate of the second iron-based powder to the whole iron-based powder were respectively set to 33% and 67% in weight ratio, was used as the iron-based powder. As the copper-based powder, copper-based powder obtained by mixing first copper-based powder including particles, each having a diameter of 45 μm or smaller, at from 55% to 75% in weight ratio and second copper-based powder including particles, each having a diameter of 45 μm or smaller, at from 55% to 90% in weight ratio, in which the rate of the first copper-based powder and the rate of the second copper-based powder to the whole copper-based powder were respectively set to 71% and 29% in weight ratio, was used. Then, a green compact manufactured by compression-molding the above-mentioned raw material powder at a relatively large molding pressure was heated and sintered to obtain a bearing member according to Example 1, whereas a green compact manufactured by compression-molding the above-mentioned raw material powder at a relatively small molding pressure was heated and sintered to obtain a bearing member according to Example 2.

EXAMPLES

The raw material powder containing the iron-based powder and the copper-based powder substantially respectively at 40% and 60% in weight ratio was used. In the raw material powder, iron-based powder obtained by mixing the first iron-based powder and the second iron-based powder in which the rate of the first iron-based powder and the rate of the second iron-based powder to the whole iron-based powder were respectively set to 33% and 67% in weight ratio, was used as the iron-based powder. As the copper-based powder, copper-based powder obtained by mixing the first copper-based powder and the second copper-based powder in which the rate of the first copper-based powder and the rate of the second copper-based powder to the whole copper-based powder were respectively set to 71% and 29% in weight ratio, was used. Then, a green compact manufactured by compression-molding the above-mentioned raw material powder was heated and sintered to obtain a bearing member according to the related-art example.

Figure 8:
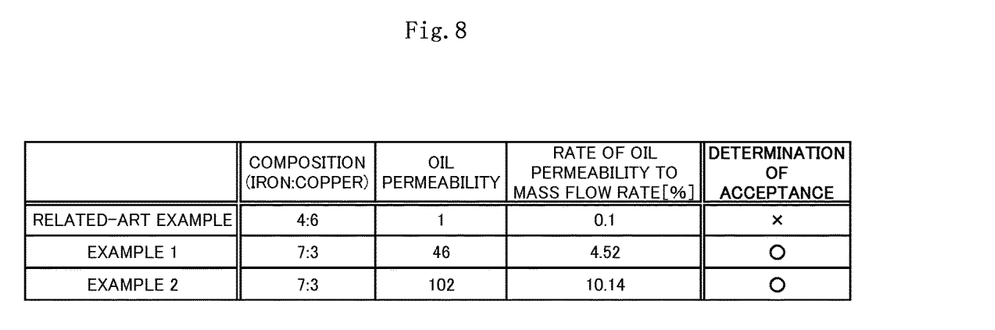
FIG. 8 is a table for showing test results of a comparative test.

Subsequently, oil permeabilities of the bearing members according to the related-art example and Examples 1 and 2 were measured by the testing device illustrated in FIG. 6. When the oil permeability of the bearing member according to the related-art example was defined as "1", the oil permeabilities of the bearing members according to Example 1 and Example 2 were respectively "46" and "102" as shown in FIG. 8. At this time, a ratio of the oil permeability of the bearing member and the mass flow rate of the lubricating oil flowing along the thrust dynamic pressure generating portion during the rotation of the rotary body (the rate of the oil permeability to the mass flow rate) was 0.1% for the bearing member according to the related-art example, and 4.52% and 10.14% for the bearing members according to Example 1 and Example 2, respectively, as shown in FIG. 8. When the rotary body was rotated at the rotating speed described above, the floating amount of the rotary body became excessively large in the related-art example, whereas the floating amount of the rotary body was maintained within an appropriate range in both of Examples 1 and 2.

From the above-mentioned results of the comparative test, the utility of the present invention was demonstrated.

REFERENCE SIGNS LIST 1 fluid dynamic bearing device
2A rotary body
2B stationary body
3 rotor
4 rotor magnet
5 stator coil
6 motor base
7 housing
9 sealing member
10 axial gap
11 lubricating oil
12 pushing portion
13 groove portion
21 shaft member
22 bearing member (sleeve portion)
22b upper end surface (end surface on other side in axial direction)
22c lower end surface (end surface on one side in axial direction)
100 testing device of oil permeability
A radial dynamic pressure generating portion B thrust dynamic pressure generating portion
S sealing gap
R radial bearing portion
T thrust bearing portion

The invention claimed is:

1. A fluid dynamic bearing device, comprising:
a stationary body;
a rotary body configured to rotate relative to the stationary body;
a sleeve portion made of a sintered metal provided to the stationary body or the rotary body, the sleeve portion having end surfaces on both sides in an axial direction of the sleeve portion;
a radial bearing gap formed by an outer peripheral surface of the sleeve portion;
a thrust bearing gap formed by the end surface of the sleeve portion on one side in the axial direction of the sleeve portion;
lubricating oil for filling internal pores of the sleeve portion, the radial bearing gap, and the thrust bearing gap; and
a thrust dynamic pressure generating portion, wherein:
the lubricating oil present in the thrust bearing gap is caused to flow along the thrust dynamic pressure generating portion along with a rotation of the rotary body, to thereby cause a dynamic pressure generating action in the lubricating oil present in the thrust bearing gap, resulting in supporting the rotary body in a non-contact manner in one thrust direction; and
the sleeve portion has an oil permeability of 4% to 15% with respect to a mass flow rate of the lubricating oil flowing along the thrust dynamic pressure generating portion during the rotation of the rotary body.

2. The fluid dynamic bearing device according to claim 1, wherein the sleeve portion is formed by sintering a green compact of raw material powder containing iron-based powder and copper-based powder, and has an iron content larger than a copper content.

3. The fluid dynamic bearing device according to claim 2, wherein the iron-based powder comprises iron-based powder having a relatively large mean particle diameter, and the copper-based powder comprises copper-based powder having a relatively small mean particle diameter.

4. The fluid dynamic bearing device according to claim 2, wherein the sleeve portion is formed by heating the green compact at 900° C. or higher to 1,000° C. or lower.

5. The fluid dynamic bearing device according to claim 1, wherein a sintered density of the sleeve portion is 7.0 g/cm$^3$ or smaller.

6. The fluid dynamic bearing device according to claim 1, wherein the lubricating oil comprises lubricating oil having a kinetic viscosity of 40 mm$^2$/s or larger at 40° C. and a kinetic viscosity of 6 mm$^2$/s or larger at 100° C.

7. The fluid dynamic bearing device according to claim 1, wherein:
the stationary body has a bottomed cylindrical shape with a closed end comprising a cylindrical portion and a bottom portion for closing one side of the cylindrical portion in the axial direction of the cylindrical portion, and the stationary body comprises a housing for housing the sleeve portion on an inner periphery of the cylindrical portion and a sealing member for opening another side of the sleeve portion in the axial direction of the sleeve portion to an atmosphere through a sealing gap;
the rotary body comprises a shaft member having an outer periphery onto which the sleeve portion is fixed, for forming a sealing gap between the sealing member and the shaft member;
the radial bearing gap is formed between an outer peripheral surface of the sleeve portion and an inner peripheral surface of the housing opposed to the outer peripheral surface of the sleeve portion, and the thrust bearing gap is formed between the end surface of the sleeve portion on the one side in the axial direction of the sleeve portion and an inner bottom surface of the housing opposed to the end surface of the sleeve portion on the one side; and
an axial gap containing air is formed between the end surface of the sleeve portion on the another side in the axial direction of the sleeve portion and an end surface of the sealing member opposed to the end surface of the sleeve portion on the another side.

8. The fluid dynamic bearing device according to claim 1, wherein an external force for pushing the sleeve portion to the one side in the axial direction of the sleeve portion is exerted on the sleeve portion to support the rotary body in another thrust direction in a non-contact manner.

9. The fluid dynamic bearing device according to claim 7, further comprising a pushing portion for pushing the lubricating oil present in the axial gap in a direction away from the sealing gap in a radial direction during the rotation of the rotary body.

10. A motor, comprising the fluid dynamic bearing device of claim 1.

* * * * *